(12) United States Patent
Ackley

(10) Patent No.: US 11,152,812 B2
(45) Date of Patent: *Oct. 19, 2021

(54) POWERING DEVICES USING LOW-CURRENT POWER SOURCES

(71) Applicant: Datamax-O'Neil Corporation, Altamonte Springs, FL (US)

(72) Inventor: H. Sprague Ackley, Seattle, WA (US)

(73) Assignee: DATAMAX-O'NEIL CORPORATION, Altamonte Springs, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/922,919

(22) Filed: Jul. 7, 2020

(65) Prior Publication Data
US 2020/0373777 A1 Nov. 26, 2020

Related U.S. Application Data

(63) Continuation of application No. 15/843,681, filed on Dec. 15, 2017, now Pat. No. 10,756,563.

(51) Int. Cl.
*H02J 7/04* (2006.01)
*H02J 7/35* (2006.01)
*H02J 3/38* (2006.01)
*H02J 9/06* (2006.01)
*H02J 7/34* (2006.01)
*H02J 7/00* (2006.01)

(52) U.S. Cl.
CPC ........ *H02J 7/045* (2013.01); *H02J 3/38* (2013.01); *H02J 3/383* (2013.01); *H02J 7/00714* (2020.01); *H02J 7/345* (2013.01); *H02J 7/35* (2013.01); *H02J 9/06* (2013.01)

(58) Field of Classification Search
CPC ....................................................... H02J 7/345
USPC ......................................................... 320/167
See application file for complete search history.

(56) References Cited

U.S. PATENT DOCUMENTS

| 5,300,875 | A | 4/1994 | Tuttle |
| 6,832,725 | B2 | 12/2004 | Gardiner et al. |
| 7,128,266 | B2 | 10/2006 | Zhu et al. |
| 7,159,783 | B2 | 1/2007 | Walczyk et al. |

(Continued)

FOREIGN PATENT DOCUMENTS

| EP | 3190547 A1 | 7/2017 |
| GB | 0253845 A | 6/1926 |

(Continued)

OTHER PUBLICATIONS

European Search Report for EP Application No. 17150324.6; dated May 30, 2017; 9 pages.

(Continued)

*Primary Examiner* — Edward Tso
*Assistant Examiner* — Ahmed H Omar
(74) *Attorney, Agent, or Firm* — Alston & Bird LLP

(57) ABSTRACT

Devices, systems, and methods may use a low current power source to charge an intermediate storage unit, providing sufficient electric power to perform various device functions. A voltage of the intermediate storage unit may be monitored using a voltage monitoring circuit, and a primary storage unit may be charged using current from the intermediate storage unit when the voltage of the intermediate storage unit meets a threshold.

20 Claims, 9 Drawing Sheets

(56) References Cited

U.S. PATENT DOCUMENTS

| | | |
|---|---|---|
| 7,413,127 B2 | 8/2008 | Ehrhart et al. |
| 7,726,575 B2 | 6/2010 | Wang et al. |
| 8,148,954 B1 | 4/2012 | Kehlstadt et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,810,369 B2 | 8/2014 | Ackley |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |

(56) References Cited

U.S. PATENT DOCUMENTS

| | | |
|---|---|---|
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,082,031 B2 | 7/2015 | Liu et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein, Jr. |
| 9,412,242 B2 | 8/2016 | Van et al. |
| 9,418,269 B2 | 8/2016 | Havens et al. |
| 9,418,270 B2 | 8/2016 | Van et al. |
| 9,423,318 B2 | 8/2016 | Liu et al. |
| 9,424,454 B2 | 8/2016 | Tao et al. |
| D766,244 S | 9/2016 | Zhou et al. |
| 9,436,860 B2 | 9/2016 | Smith et al. |
| 9,443,123 B2 | 9/2016 | Hejl |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |

(56) References Cited

U.S. PATENT DOCUMENTS

| | | | |
|---|---|---|---|
| 9,478,113 | B2 | 10/2016 | Xie et al. |
| 9,478,983 | B2 | 10/2016 | Kather et al. |
| D771,631 | S | 11/2016 | Fitch et al. |
| 9,481,186 | B2 | 11/2016 | Bouverie et al. |
| 9,487,113 | B2 | 11/2016 | Schukalski |
| 9,488,986 | B1 | 11/2016 | Solanki |
| 9,489,782 | B2 | 11/2016 | Payne et al. |
| 9,490,540 | B1 | 11/2016 | Davies et al. |
| 9,491,729 | B2 | 11/2016 | Rautiola et al. |
| 9,497,092 | B2 | 11/2016 | Gomez et al. |
| 9,507,974 | B1 | 11/2016 | Todeschini |
| 9,519,814 | B2 | 12/2016 | Cudzilo |
| 9,521,331 | B2 | 12/2016 | Bessettes et al. |
| 9,530,038 | B2 | 12/2016 | Xian et al. |
| D777,166 | S | 1/2017 | Bidwell et al. |
| 9,558,386 | B2 | 1/2017 | Yeakley |
| 9,572,901 | B2 | 2/2017 | Todeschini |
| 9,606,581 | B1 | 3/2017 | Howe et al. |
| D783,601 | S | 4/2017 | Schulte et al. |
| D785,617 | S | 5/2017 | Bidwell et al. |
| D785,636 | S | 5/2017 | Oberpriller et al. |
| 9,646,189 | B2 | 5/2017 | Lu et al. |
| 9,646,191 | B2 | 5/2017 | Unemyr et al. |
| 9,652,648 | B2 | 5/2017 | Ackley et al. |
| 9,652,653 | B2 | 5/2017 | Todeschini et al. |
| 9,656,487 | B2 | 5/2017 | Ho et al. |
| 9,659,198 | B2 | 5/2017 | Giordano et al. |
| D790,505 | S | 6/2017 | Vargo et al. |
| D790,546 | S | 6/2017 | Zhou et al. |
| 9,680,282 | B2 | 6/2017 | Hanenburg |
| 9,697,401 | B2 | 7/2017 | Feng et al. |
| 9,701,140 | B1 | 7/2017 | Alaganchetty et al. |
| 10,811,762 | B2 * | 10/2020 | Ackley .............. G06K 19/0709 |
| 2003/0231001 | A1 | 12/2003 | Bruning |
| 2005/0116544 | A1 | 6/2005 | Hamel et al. |
| 2006/0094425 | A1 | 5/2006 | Mickle et al. |
| 2007/0063048 | A1 | 3/2007 | Havens et al. |
| 2008/0185432 | A1 | 8/2008 | Caballero et al. |
| 2009/0134221 | A1 | 5/2009 | Zhu et al. |
| 2010/0026243 | A1 | 2/2010 | Tatsumi |
| 2010/0026248 | A1 | 2/2010 | Barrade et al. |
| 2010/0177076 | A1 | 7/2010 | Essinger et al. |
| 2010/0177080 | A1 | 7/2010 | Essinger et al. |
| 2010/0177707 | A1 | 7/2010 | Essinger et al. |
| 2010/0177749 | A1 | 7/2010 | Essinger et al. |
| 2010/0265880 | A1 | 10/2010 | Rautiola et al. |
| 2011/0133551 | A1 * | 6/2011 | Moller .............. H04L 12/40045 307/11 |
| 2011/0169999 | A1 | 7/2011 | Grunow et al. |
| 2011/0202554 | A1 | 8/2011 | Powilleit et al. |
| 2011/0254510 | A1 | 10/2011 | Chuang et al. |
| 2011/0254514 | A1 | 10/2011 | Fleming |
| 2012/0111946 | A1 | 5/2012 | Golant |
| 2012/0168511 | A1 | 7/2012 | Kotlarsky et al. |
| 2012/0168512 | A1 | 7/2012 | Kotlarsky et al. |
| 2012/0193423 | A1 | 8/2012 | Samek |
| 2012/0194692 | A1 | 8/2012 | Mers et al. |
| 2012/0203647 | A1 | 8/2012 | Smith |
| 2012/0223141 | A1 | 9/2012 | Good et al. |
| 2012/0228382 | A1 | 9/2012 | Havens et al. |
| 2012/0248188 | A1 | 10/2012 | Kearney |
| 2012/0256492 | A1 | 10/2012 | Song et al. |
| 2012/0256583 | A1 | 10/2012 | Davis |
| 2012/0319487 | A1 | 12/2012 | Shah |
| 2013/0043312 | A1 | 2/2013 | Van Horn |
| 2013/0075168 | A1 | 3/2013 | Amundsen et al. |
| 2013/0082104 | A1 | 4/2013 | Kearney et al. |
| 2013/0175341 | A1 | 7/2013 | Kearney et al. |
| 2013/0175343 | A1 | 7/2013 | Good |
| 2013/0221918 | A1 | 8/2013 | Hill et al. |
| 2013/0257744 | A1 | 10/2013 | Daghigh et al. |
| 2013/0257759 | A1 | 10/2013 | Daghigh |
| 2013/0270346 | A1 | 10/2013 | Xian et al. |
| 2013/0292475 | A1 | 11/2013 | Kotlarsky et al. |
| 2013/0292477 | A1 | 11/2013 | Hennick et al. |
| 2013/0293539 | A1 | 11/2013 | Hunt et al. |
| 2013/0293540 | A1 | 11/2013 | Laffargue et al. |
| 2013/0306728 | A1 | 11/2013 | Thuries et al. |
| 2013/0306731 | A1 | 11/2013 | Pedrao |
| 2013/0307964 | A1 | 11/2013 | Bremer et al. |
| 2013/0308625 | A1 | 11/2013 | Park et al. |
| 2013/0313324 | A1 | 11/2013 | Koziol et al. |
| 2013/0332524 | A1 | 12/2013 | Fiala et al. |
| 2013/0332996 | A1 | 12/2013 | Fiala et al. |
| 2014/0001267 | A1 | 1/2014 | Giordano et al. |
| 2014/0002828 | A1 | 1/2014 | Laffargue et al. |
| 2014/0025584 | A1 | 1/2014 | Liu et al. |
| 2014/0034734 | A1 | 2/2014 | Sauerwein, Jr. |
| 2014/0036848 | A1 | 2/2014 | Pease et al. |
| 2014/0039693 | A1 | 2/2014 | Havens et al. |
| 2014/0049120 | A1 | 2/2014 | Kohtz et al. |
| 2014/0049635 | A1 | 2/2014 | Laffargue et al. |
| 2014/0061306 | A1 | 3/2014 | Wu et al. |
| 2014/0063289 | A1 | 3/2014 | Hussey et al. |
| 2014/0066136 | A1 | 3/2014 | Sauerwein et al. |
| 2014/0067692 | A1 | 3/2014 | Ye et al. |
| 2014/0070005 | A1 | 3/2014 | Nahill et al. |
| 2014/0071840 | A1 | 3/2014 | Venancio |
| 2014/0074746 | A1 | 3/2014 | Wang |
| 2014/0076974 | A1 | 3/2014 | Havens et al. |
| 2014/0078342 | A1 | 3/2014 | Li et al. |
| 2014/0097249 | A1 | 4/2014 | Gomez et al. |
| 2014/0098792 | A1 | 4/2014 | Wang et al. |
| 2014/0100774 | A1 | 4/2014 | Showering |
| 2014/0100813 | A1 | 4/2014 | Showering |
| 2014/0103115 | A1 | 4/2014 | Meier et al. |
| 2014/0104413 | A1 | 4/2014 | McCloskey et al. |
| 2014/0104414 | A1 | 4/2014 | McCloskey et al. |
| 2014/0104416 | A1 | 4/2014 | Giordano et al. |
| 2014/0106725 | A1 | 4/2014 | Sauerwein, Jr. |
| 2014/0108010 | A1 | 4/2014 | Maltseff et al. |
| 2014/0108402 | A1 | 4/2014 | Gomez et al. |
| 2014/0108682 | A1 | 4/2014 | Caballero |
| 2014/0110485 | A1 | 4/2014 | Toa et al. |
| 2014/0114530 | A1 | 4/2014 | Fitch et al. |
| 2014/0125853 | A1 | 5/2014 | Wang |
| 2014/0125999 | A1 | 5/2014 | Longacre et al. |
| 2014/0129378 | A1 | 5/2014 | Richardson |
| 2014/0131443 | A1 | 5/2014 | Smith |
| 2014/0131444 | A1 | 5/2014 | Wang |
| 2014/0133379 | A1 | 5/2014 | Wang et al. |
| 2014/0136208 | A1 | 5/2014 | Maltseff et al. |
| 2014/0140585 | A1 | 5/2014 | Wang |
| 2014/0152882 | A1 | 6/2014 | Samek et al. |
| 2014/0158770 | A1 | 6/2014 | Sevier et al. |
| 2014/0159869 | A1 | 6/2014 | Zumsteg et al. |
| 2014/0166755 | A1 | 6/2014 | Liu et al. |
| 2014/0166757 | A1 | 6/2014 | Smith |
| 2014/0166759 | A1 | 6/2014 | Liu et al. |
| 2014/0168787 | A1 | 6/2014 | Wang et al. |
| 2014/0175165 | A1 | 6/2014 | Havens et al. |
| 2014/0191684 | A1 | 7/2014 | Valois |
| 2014/0191913 | A1 | 7/2014 | Ge et al. |
| 2014/0197239 | A1 | 7/2014 | Havens et al. |
| 2014/0197304 | A1 | 7/2014 | Feng et al. |
| 2014/0204268 | A1 | 7/2014 | Grunow et al. |
| 2014/0214631 | A1 | 7/2014 | Hansen |
| 2014/0215228 | A1 | 7/2014 | Choon et al. |
| 2014/0217166 | A1 | 8/2014 | Berthiaume et al. |
| 2014/0217180 | A1 | 8/2014 | Liu |
| 2014/0231500 | A1 | 8/2014 | Ehrhart |
| 2014/0247315 | A1 | 9/2014 | Marty et al. |
| 2014/0263493 | A1 | 9/2014 | Amurgis et al. |
| 2014/0263645 | A1 | 9/2014 | Smith et al. |
| 2014/0270196 | A1 | 9/2014 | Braho et al. |
| 2014/0270229 | A1 | 9/2014 | Braho |
| 2014/0278387 | A1 | 9/2014 | Digregorio |
| 2014/0282210 | A1 | 9/2014 | Bianconi |
| 2014/0288933 | A1 | 9/2014 | Braho et al. |
| 2014/0297058 | A1 | 10/2014 | Barker et al. |
| 2014/0299665 | A1 | 10/2014 | Barber et al. |
| 2014/0300310 | A1 | 10/2014 | Caren |
| 2014/0332590 | A1 | 11/2014 | Wang et al. |
| 2014/0351317 | A1 | 11/2014 | Smith et al. |

(56) References Cited

U.S. PATENT DOCUMENTS

| | | |
|---|---|---|
| 2014/0354412 A1 | 12/2014 | Ackley |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley et al. |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0327012 A1 | 11/2015 | Bian et al. |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0070944 A1 | 3/2016 | McCloskey et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | Dipiazza et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |

(56) References Cited

U.S. PATENT DOCUMENTS

| | | |
|---|---|---|
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van et al. |
| 2017/0199266 A1 | 7/2017 | Rice et al. |
| 2017/0200108 A1 | 7/2017 | Au et al. |
| 2017/0200275 A1 | 7/2017 | McCloskey et al. |
| 2017/0201003 A1 | 7/2017 | Ackley et al. |
| 2019/0148985 A1* | 5/2019 | Barukh .................. H01Q 1/248 307/104 |
| 2020/0119585 A1* | 4/2020 | Rodrigues Mansano .................... G01R 27/2605 |

FOREIGN PATENT DOCUMENTS

| | | |
|---|---|---|
| WO | 2008/010890 A2 | 1/2008 |
| WO | 2013/163789 A1 | 11/2013 |

OTHER PUBLICATIONS

Final Rejection dated Dec. 12, 2019 for U.S. Appl. No. 15/843,681.

Great Britain Combined Search and Examination Report in related Application No. GB1600103.4 [Published as GB2535845], dated Jun. 23, 2016; 7 pages.

Non-Final Rejection dated May 31, 2019 for U.S. Appl. No. 15/843,681.

Notice of Allowance and Fees Due (PTOL-85) dated Jul. 27, 2020 for U.S. Appl. No. 15/843,681.

Notice of Allowance and Fees Due (PTOL-85) dated Mar. 26, 2020 for U.S. Appl. No. 15/843,681.

U.S. Appl. No. 15/843,681, filed Dec. 15, 2017, 2019-0190304, Allowed.

* cited by examiner

POWERING DEVICES USING LOW-CURRENT POWER SOURCES

CROSS-REFERENCE TO RELATED APPLICATIONS

This application is a continuation of U.S. application Ser. No. 15/843,681, filed Dec. 15, 2017, the entire contents of which are incorporated herein by reference.

FIELD OF THE INVENTION

The present disclosure relates to devices, systems, and methods that use a low current power source to perform various device functions, including devices, systems, and methods that use a lower current power source to charge an intermediate storage unit, providing sufficient electric power to perform various device functions.

BACKGROUND

Conventional battery powered devices are stationed throughout facilities, often in locations without an electrical outlet nearby. Such devices require periodic recharging or replacement of batteries. Some devices rely on battery power alone. Recharging or replacing batteries tends to be inconvenient, particularly when there is not an electrical outlet nearby for a charging station. For example, distributed computing systems may be implemented in a wide variety of settings, including hospitals and other healthcare facilities, and supply chain distribution facilities and resources. Distributed computing systems commonly include points of use without an electrical outlet nearby. Inconveniences of recharging or replacing batteries typically limits the feasibility of deploying battery powered devices in remote or infrequently occupied locations. Workers may be inconsistent or unreliable about maintaining adequately charged batteries in distributed devices. Additionally, some devices may remain unattended or inaccessible for extended periods of time.

Low current power sources such as those available from a powered Ethernet cable or a radio frequency field can be "harvested" to supplement a device's power consumption from a battery by using a trickle flow of electricity from such low current power source. Various approaches to harvesting a trickle flow of electricity from low current power sources are discussed in the art. However, existing approaches are generally insufficient to provide a substantive practical benefit, such as powering a device or recharging batteries. Conventional rechargeable batteries require a significant potential difference to reverse the chemical reactions used to store electrical energy. Capacitors or super-capacitors are an alternative to rechargeable batteries for storing power; however, capacitors and even super-capacitors are less effective at storing a charge for extended periods of time compared with batteries. Therefore, there exist a need for further improved devices, systems, and methods that use electricity harvested from a low current power source to charge an intermediate storage unit, providing sufficient electric power to perform various device functions.

SUMMARY

Accordingly, in one aspect, the present disclosure embraces a method of providing electric power to an electric component in a device. In one embodiment, the method includes receiving electric current from one or more low current power sources (e.g., a powered Ethernet cable connected to a device or a radio frequency field), charging an intermediate storage unit in the device with the electric current from the low current power source, monitoring a voltage of the intermediate storage unit using a voltage monitoring circuit communicatively coupled to a processor, charging a primary storage unit using electric current from the intermediate storage unit when the processor ascertains that the voltage of the intermediate storage unit meets or exceeds a threshold (the intermediate storage unit discharging the electric current to the primary storage unit), and providing electric current from the primary storage unit to a component, allowing the component using the electric current to cause the device to perform a function.

The intermediate storage unit may include at least one capacitor and/or at least one supercapacitor, such as a plurality of capacitors and/or supercapacitors in series or parallel. The primary storage unit may include a rechargeable battery and/or a supercapacitor, such as a plurality of supercapacitors and/or rechargeable batteries in series or parallel.

The device may be a printer, such as a thermal printer, and the component may be or may include a printing mechanism. The printing mechanism may be a printhead or other printing component. The printhead may be a thermal printhead. Other devices and components will be apparent and are within the spirit and scope of the present disclosure, many of which are described herein. In some embodiments, the component may receive electric power solely from the primary storage unit.

The threshold may include or depend on a voltage range of the intermediate storage unit. The range may fall between a lower voltage sufficient for efficiently discharging current to the primary storage unit and an upper voltage sufficient for further charging of the intermediate storage to be inefficient.

In another aspect, the present disclosure embraces a device configured to use electric current from one or more low current power sources to perform one or more functions. The low current power source may be a powered Ethernet cable, or an electric field or magnetic field associated with a wireless communications or broadcast signal. In some embodiments the low current power source may be an electric field or magnetic field associated with FM or AM radio waves. In some embodiments, the device includes an intermediate storage unit and a primary storage unit. The intermediate storage unit may be configured to receive electric current from the low current power source. The primary storage unit may be configured to receive electric current from the intermediate storage unit. The electric current from the intermediate storage unit may at least partially charge the primary storage unit.

An exemplary device may include a voltage monitor circuit communicatively coupled to a processor, and the processor may be configured to monitor a voltage of the intermediate storage unit. The primary storage unit may be configured to receive electric current from the intermediate storage unit when the processor ascertains that the voltage of the intermediate storage unit meets or exceeds a threshold. The device may further include one or more components configured to use electric current from the primary storage unit to perform a function. The primary storage unit may be configured to provide the electric current to the component.

In some embodiments, the device or the one or more components typically receive intermittent use at time intervals matching or exceeding a positive multiple of a time constant, $\tau$ (tau). The time constant depends on a resistance of charging the intermediate storage unit multiplied by a capacitance of the intermediate storage unit. The intermediate storage unit may accumulate a voltage over the positive multiple of the time constant, that exceeds the charge consumed by a typical instance of use of the component.

In another aspect, the present disclosure embraces a distributed computing system that includes a plurality of devices in communication with at least one network resource on a computer network. The network resource may be configured to monitor the plurality of devices on the computer network, receive a signal indicating a task to be performed; and preferentially assigning the task to a device selected from among the plurality of devices. Such device may be selected based at least in part on a threshold or parameter associated with the intermediate storage unit and/or power consumption by the device.

The plurality of devices may typically receive intermittent use at time intervals matching or exceeding a positive multiple of a time constant $\tau$ (tau). The time constant depends on a resistance of charging the respective intermediate storage unit multiplied by a capacitance of the respective intermediate storage unit. The respective intermediate storage units may be configured to accumulate a voltage over the positive multiple of the time constant which voltage exceeds the electrical power consumed by a typical instance of use of the respective component.

The foregoing summary is illustrative only, and is not intended to be in any way limiting. In addition to the illustrative features and embodiments described above, further aspects, features, and embodiments will become apparent by references to the following drawings, the detailed description set forth below, and the claims.

DETAILED DESCRIPTION

In the following detailed description, various aspects and features are described in greater detail with reference to the accompanying figures, including among other aspects and features, exemplary devices, systems, and methods that use a low current power source to perform various device functions, including devices, systems, and methods that use a lower current power source to charge an intermediate storage unit, providing sufficient electric power to perform various device functions. Numerous specific details are set forth in order to provide a thorough understanding of the present disclosure. It will be apparent, however, to one skilled in the art that the presently disclosed devices, systems, and methods may be provided without some or all of these specific details. In other instances, well known aspects have not been described in detail in order not to unnecessarily obscure the present disclosure. The following detailed description is therefore not to be taken in a limiting sense, and it is intended that other embodiments are within the spirit and scope of the present disclosure.

Electrical energy can be "harvested" from any low current power source. Exemplary low current power sources include a powered Ethernet cable, a powered Universal Serial Bus, and/or magnetic fields or electric fields associated with Wi-Fi and other wireless communication or broadcast signals. In some embodiments, the low current power source may be an electric field or magnetic field associated with FM or AM radio waves. In some embodiments, the low current power source may be light energy harvested using one or more solar cells. The solar cells may be configured to harvest light energy present in the environment, including direct or indirect sunlight, ambient light, room lights, and combinations thereof.

Figure 1:
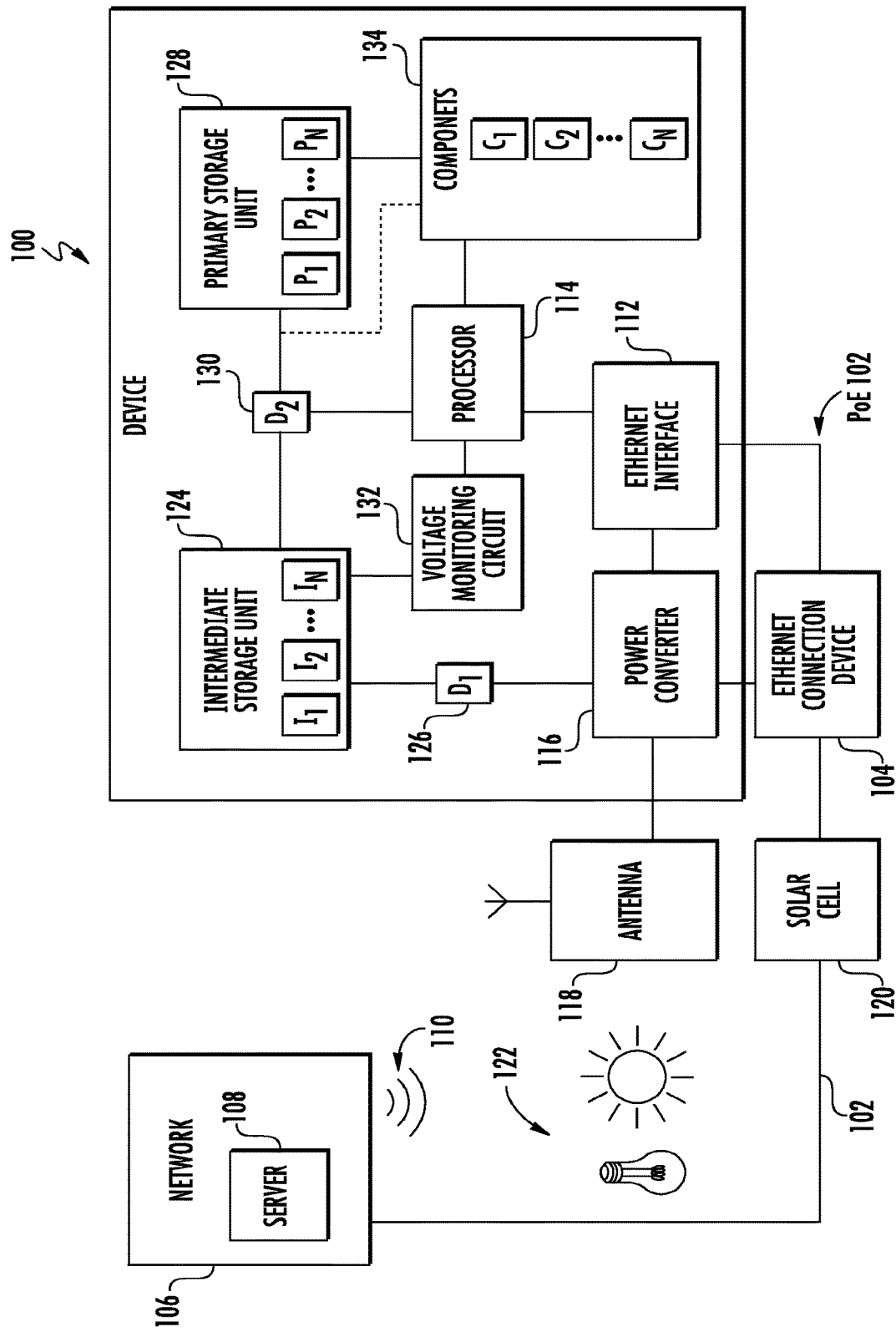
FIG. 1 schematically depicts an exemplary device configured to harvest energy from a low current power source.

FIG. 1 shows a device 100 configured to harvest electrical energy from a low current power source. In various embodiments, the device 100 may be a workflow solutions tool deployed in a distributed computing system. The device may be a printer (such as a thermal transfer printer), a mobile device (such as a mobile phone or a tablet), a barcode scanner, a dimensioner, or any other device. The device may perform several functions in a distributed computing system, such as scanning and printing.

Exemplary distributed computing systems include those typically deployed in healthcare facilities or supply chain environments. For example, a healthcare facility such as a hospital may have a distributed computing system with printers, scanners, and other devices 100 stationed throughout the facility. Such might be used by healthcare personnel to print and scan image associated with patient identification and management of care or other healthcare related tasks. Such devices 100 may include a medical device used by healthcare personnel to perform a medical treatment, procedure, or various other care. Similarly, printers, scanners, and other devices 100 may be stationed in various locations throughout a supply chain environment for use by personnel who manage or work in the supply chain or who perform various related task. Such devices 100 may include an inventory management tool used by supply chain personnel to identify or track items moving through the supply chain.

As shown in FIG. 1, the low current power source may include a powered Ethernet cable (i.e., PoE) 102. The powered Ethernet cable may supply an ethernet connection to the device 100. The ethernet connection may be supplied using an ethernet connection device 104. The Ethernet connection device 104 may allow communications across a network 106, such as between the device 100 a network resource 108 such as a server. In addition, or in the alternative, the device 100 may be configured to allow wireless communications across the network 106 using a wireless communication signal 110. The device may be configured to harvest electricity from a low current power source, such as from the powered Ethernet cable 102, from an electric or magnetic field associated with the wireless communications signal 110, or from any other suitable low current power source or combination of low current power sources.

The device 100 includes an Ethernet interface 112, which separates the data and power components from the powered Ethernet cable 102. The data component is communicated to circuitry in a processor 114 for operating the device. The power component flows to a power converter 116. The power converter is configured to convert the power component from a supply voltage to a requisite storage voltage. For example, a typical powered Ethernet cable supplies 48 volts of AC power, though other supply voltages are also possible. The power converter may be configured to convert the supply voltage to any desired storage voltage. For example, a typical device 100 may be configured to utilize 20-24 volts of DC power.

In some embodiments, the device 100 may include an antenna 118 configured to receive wireless communication or broadcast signals 110. Electric or magnetic fields associated with the signals may be converted to a desired storage voltage using an appropriately configured power converter 116.

In some embodiments, the device 100 may include one or more solar cells 120 configured to harvest light energy present in the environment 122. The light energy harvested by the solar cells may include direct or indirect sunlight, ambient light, room lights, and combinations thereof. Light energy harvested by the solar cells may be converted to a desired storage voltage using an appropriately configured power converter 116.

Electric current from the power converter 116 is supplied to an intermediate storage unit 124. The intermediate storage unit may be a capacitor or a supercapacitor, or an arrangement of several capacitors or supercapacitors (e.g., intermediate storage units $I_1$ through $I_n$). The capacitors or supercapacitors making up the intermediate storage unit may be arranged in parallel or series, or combinations thereof. A diode (e.g., D1) 126 or similar circuitry may be provided to permit the flow of electric current from the power converter to the intermediate storage unit.

The intermediate storage unit periodically discharges electric current to a primary storage unit 128. The primary storage unit may be a rechargeable battery or a supercapacitor, or an arrangement of multiple rechargeable batteries or supercapacitors (e.g., primary storage units $P_1$ through $P_n$). The rechargeable batteries or supercapacitors making up the primary storage unit may be arranged in parallel or series, or combinations thereof. A diode (e.g., D2) 130 or similar circuitry may be provided to permit the flow of electric current from the intermediate storage unit to the primary storage unit.

In some embodiments, a voltage monitoring circuit 132 may be provided. The voltage monitoring circuit may be configured to enable the processor 114 to monitor the voltage across the intermediate storage unit. The processor may be further configured to control the charging and discharging of the intermediate storage unit, for example, using control circuitry associated with the diode 130.

The device 100 includes one or more components (e.g., components $C_1$ through $C_n$) 134 configured to receive power from the primary storage unit. The components 134 may include a subset of the powered components in the device. For example, the components 134 may receive power from the primary storage unit, and other powered components in the device may receive power from a different source such as a different battery or the like. In some embodiments, the charge accumulated by the intermediate storage unit may be insufficient to power every electric component in the device, but may be sufficient to power a subset of the components 134 (e.g., components $C_1$ through $C_n$. The primary storage unit may be configured to supply power only to a subset of components. Such a subset of components may be selected based on the expected rate of energy harvesting. In some embodiments, the energy supplied by the intermediate storage unit may be sufficient to supply enough power to operate the components 134 under typical operating conditions. Under peak operating conditions (e.g., unusually frequent use, high demand situations, etc.) the components 134 may require additional power, even if the intermediate storage unit may be sufficient under typical operating conditions.

An intermediate storage unit such as a capacitor or supercapacitor can be modeled as a resistor-capacitor circuit (RC circuit). As an intermediate storage unit stores charge, the voltage V across the intermediate storage unit is proportional to the charge q stored, given by the relationship $V=q/C$ (1), where C is the capacitance. When charge flows out of the intermediate storage unit, the voltage is proportional to the current, given by the relationship $V=R \cdot dQ/dt$ (2), where R is the resistance. The equality $R \cdot dQ/dt = Q/C$ (3) has an exponential solution. Accordingly, the charge of an intermediate storage unit is given by the relationship: $Q=CV_s(1-e^{-t/RC})$ (4), where $V_s$ is the supply voltage to the intermediate storage unit, and t is the time elapsed since the application of the supply voltage. The term RC is a time constant, τ (tau), where R has units of Ohms and C has units in Farads.

As the voltage across the intermediate storage unit is proportional to its charge, the voltage displays similar exponential behavior. Accordingly, the voltage across the intermediate storage unit is given by the relationship: $V=V_s(1-e^{-t/RC})$ (5), where $V_s$ is the supply voltage to the intermediate storage unit, and t is the time elapsed since the application of the supply voltage.

Figure 2A:
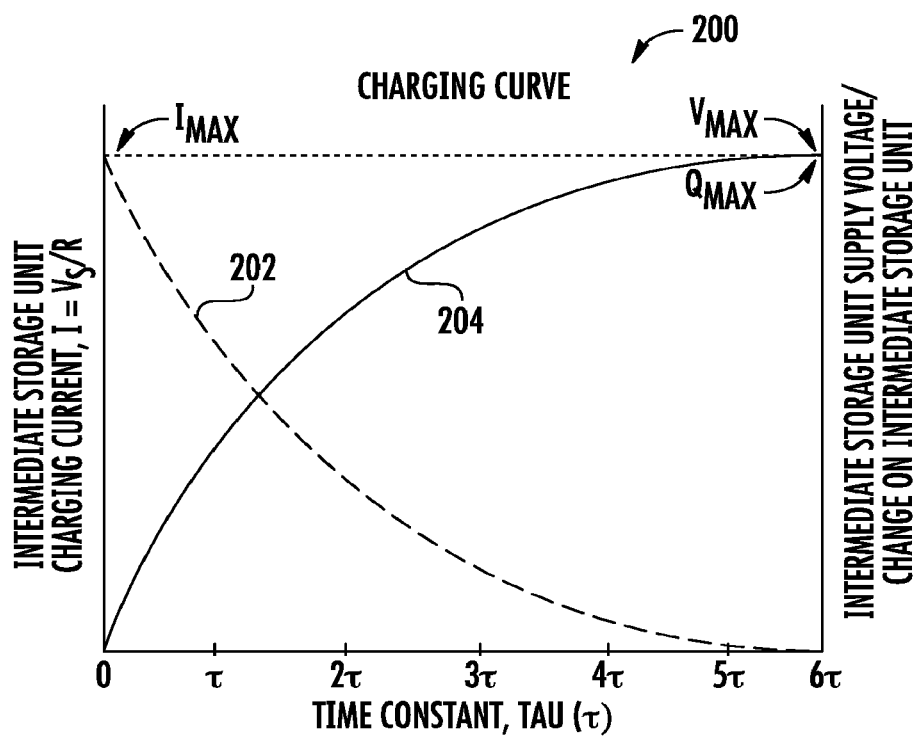
FIGS. 2A and 2B respectively depict exemplary charge and discharge curves for an intermediate storage unit.

FIG. 2A graphically depicts an exemplary charging curve 200 for an intermediate storage unit. When charging an intermediate storage unit, the charging current 202 is found by Ohm's Law as: $I=V_s/R$. The charging rate is initially high and then decreases exponentially, asymptotically approaching zero. Likewise, the charge on the intermediate storage unit 204 initially increases rapidly and then rate of increasing charge declines exponentially as the potential difference across the intermediate storage unit asymptotically approaching a maximum charge or supply voltage.

The time constant τ (tau) represents the time it takes for the voltage across the intermediate storage unit to either rise or fall to within 1/e of its final value. When charging the intermediate storage unit τ (tau) represents the time it takes to reach $V_s(1-1/e)$. When discharging the intermediate storage unit, τ (tau) is the time it takes to reach $V_s(1/e)$. The rate of change is a fractional, 1−1/e per τ (tau). As such, when charging the intermediate storage unit for a time period t=τ (tau), the supply voltage or charge on the capacitor will increase by about 63.2% (i.e., 1−1/e) from t=Nτ to t=(N+1)τ. Accordingly, the intermediate storage unit typically will be charged about 63.2% of maximum ($Q_{MAX}$) after τ (tau), and typically will be essentially fully charged (i.e., 99.3%) after 5τ. Likewise, the charging current typically will decrease by about 36.8% of maximum ($I_{MAX}$) after τ (tau), and typically will be essentially zero (i.e., 0.7%) after 5τ.

Figure 2B:
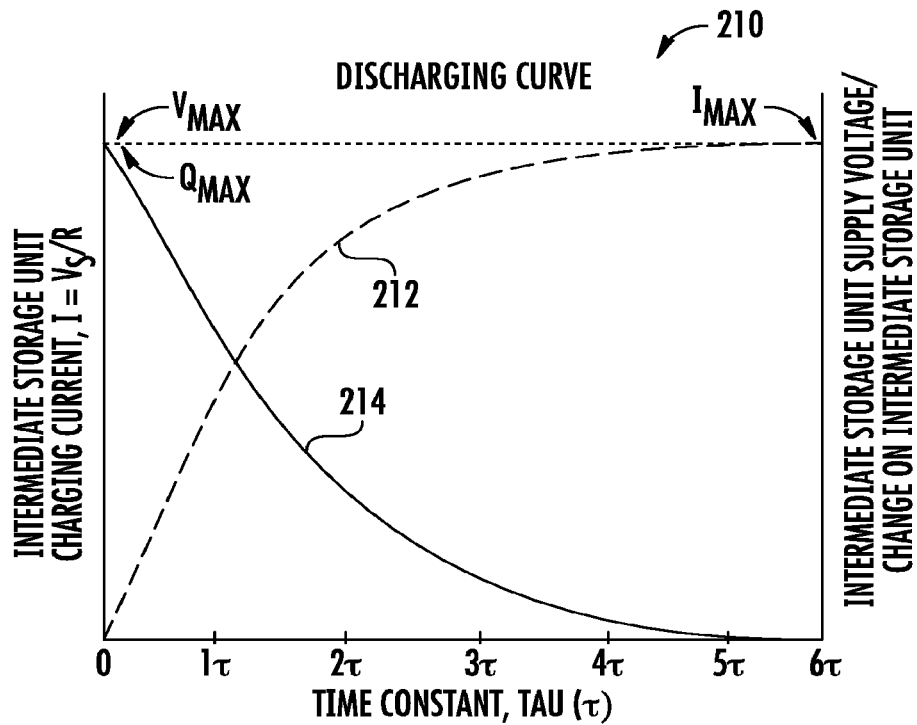

FIG. 2B graphically depicts an exemplary discharge curve 210 for an intermediate storage unit. When the intermediate storage is discharged, the discharge current 212 is initially high and then decreases exponentially with time, asymptotically approaching zero. Likewise, the charge on the intermediate storage unit 214 initially decreases rapidly and then the rate of decreasing charge declines exponentially as the potential difference across the intermediate storage unit asymptotically approaches zero. The intermediate storage unit typically will be discharged about 63.2% of maximum ($Q_{MAX}$) after τ (tau), and typically will be essentially fully discharged (i.e., 99.3%) after 5τ. Likewise, the discharging current typically will decrease by about 36.8% of maximum ($I_{MAX}$) after τ (tau), and typically will be essentially zero (i.e., 0.7%) after 5τ.

A voltage monitoring circuit 132 may be configured to allow a processor 114 to control the charging and discharging of the intermediate storage unit. The processor may provide electric power harvested from a low current power source 102, 110, to an electric component in a device 134 based at least in part on the control of such charging and discharging. The electric power may be provided to the electric component either directly or through a primary storage unit 128.

Figure 3:
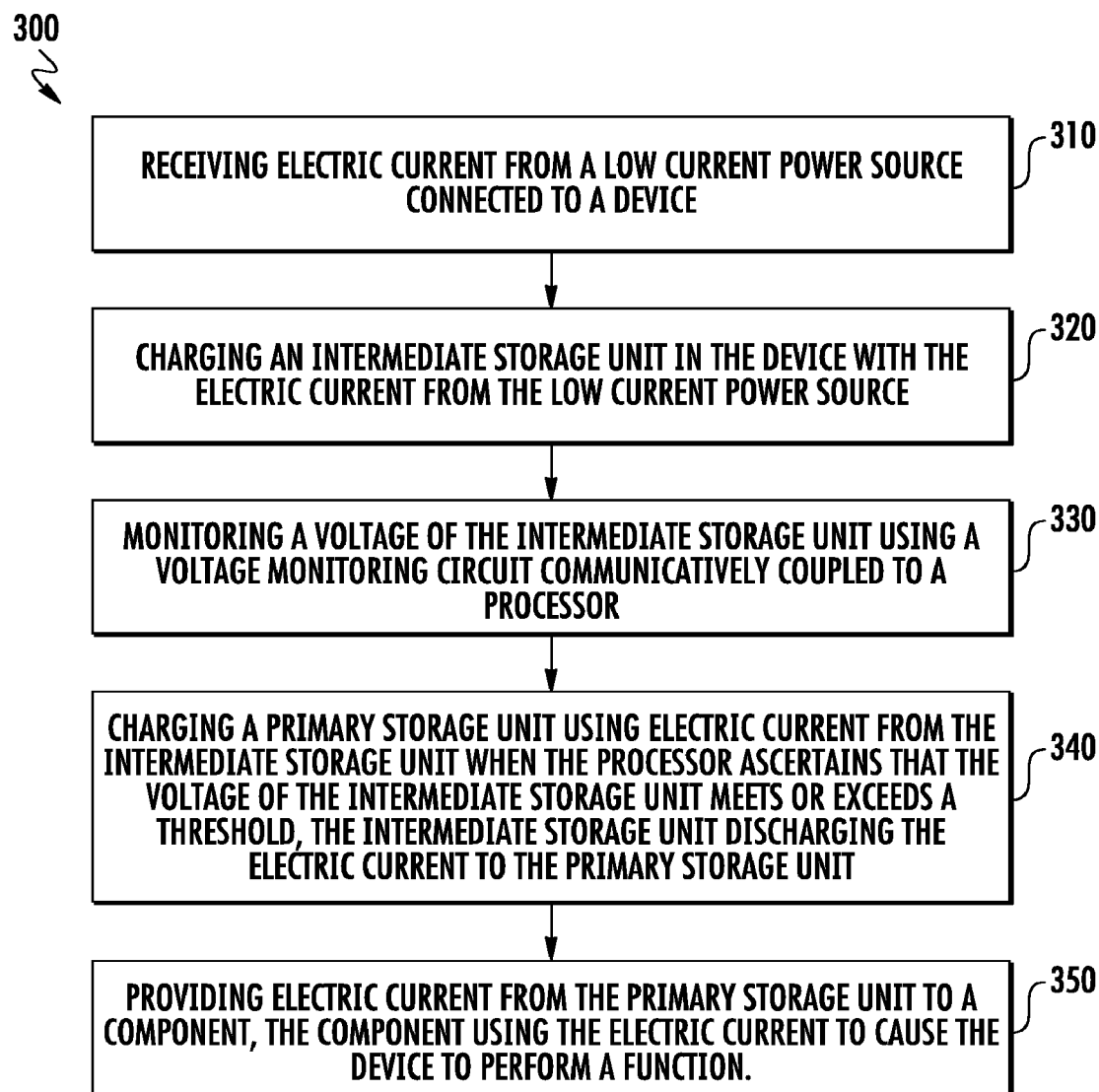
FIG. 3 shows an exemplary method of providing electric power to an electric component in a device.

FIG. 3 shows an exemplary method 300 of providing electric power to an electric component in a device. The method begins with receiving electric current from a low current power source connected to a device 310. The low current power source may be a powered Ethernet cable 102, an electric or magnetic field associated with a wireless signal 110, or any other suitable low current power source or combination of low current power sources. The method continues with charging an intermediate storage unit 124 in the device with the electric current 320, and monitoring a voltage of the intermediate storage 330 unit using a voltage monitoring circuit 132 communicatively coupled to a processor 114.

The method continues with charging a primary storage unit using electric current from the intermediate storage unit 340. In an exemplary embodiment, the processor and the voltage monitoring circuit may be configured to cause the intermediate storage unit to discharge electric current to the primary storage unit when the processor ascertains that the voltage of the intermediate storage unit meets or exceeds a threshold. The primary storage unit accordingly discharges electric current to one or more components 350. The electric current may be used by the one or more components 134 to cause the device to perform a function.

In some embodiments the method 300 may be performed using a printer, such as a thermal printer. The electric current from the primary storage unit may be used to cause a printing mechanism (e.g., a printhead) to print an image. The electric current may also be used by other components 134. In some embodiments, these components 134 may be configured to receive electric power solely form the primary storage unit.

The threshold for discharging electric current to the primary storage unit may include or depend on a voltage range of the intermediate storage unit. For example, a threshold may correspond to a voltage range falling between a lower voltage sufficient for efficiently discharging current to the primary storage unit and an upper voltage sufficient for further charging of the intermediate storage to be inefficient. The lower voltage and the upper voltage may be selected based on charging curves 200 and discharging curves 210 for the intermediate storage unit. In some embodiments, the threshold may be triggered when the processor ascertains that the voltage monitoring circuit has detected a voltage corresponding to a charge on the intermediate storage unit sufficient to provide a discharging current at least exceeding a defined value. The defined value may be a discharging current of the intermediate storage unit.

In some embodiments the threshold may include or depend on a time constant τ (tau) derived from a resistance R of charging the intermediate storage unit multiplied by a capacitance C of the intermediate storage unit. Alternatively, the threshold may include or depend on a voltage or charge on the intermediate storage unit corresponding to the time constant τ (tau). The threshold may be a range or an absolute value. For example, the threshold may include or correspond to a voltage across the intermediate storage unit (or a charge on the intermediate storage unit) corresponding to a positive multiple of the time constant τ (tau) for the intermediate storage unit.

The threshold may additionally or alternatively include or depend on one or more parameters associated with a charging curve corresponding to a primary storage unit. A primary storage unit may exhibit a charging curve given by the relationship shown in equation (5) above, similar to the charging curve shown in FIG. 2A. Typically, the supply voltage to the primary storage unit corresponds to the discharge voltage of the intermediate storage unit. The time constant, τ (tau), may differ as between charging the intermediate storage unit and discharging to the primary storage unit because of a differing resistance R or capacitance C.

Additionally, the charging current to the primary storage unit (i.e., the discharging current of the intermediate storage unit) may vary depending on the charge on the primary storage unit. When the charge on the intermediate storage unit is high, initially the discharging current to the primary storage unit will also be high. However, a high charge on the primary storage unit may add resistance to the discharge of current from the intermediate storage unit. Accordingly, in some embodiments, the threshold may depend on a relationship between the charge on the intermediate storage unit and a charge on the primary storage unit.

For example, the threshold may include or depend on the charging current of the primary storage unit (or the discharging current of the intermediate storage unit) exceeding the charging current of the intermediate storage unit. Such a threshold may dynamically vary with differing values for the respective charging currents. For example, the threshold may include or depend on an efficiency of discharging current to the primary storage unit exceeding an efficiency of further charging of the intermediate storage. An efficiency factor $E_{i-p}$ may be characterized as a ratio of the charging current of the primary storage unit over the charging current of the intermediate storage unit. The threshold may include or depend on the efficiency factor E being greater than a defined value. The defined value may be 1.0, such that the threshold will be triggered when the charging current of the primary storage unit exceeds the charging current of the intermediate storage unit. Alternatively, the defined value may be greater than 1.0, such that the threshold will be triggered when the charging current of the primary storage unit sufficiently exceeds the charging current of the intermediate storage unit by some defined amount.

In some embodiments, the charge on the primary storage unit may be configured to discharge directly to one or more components 134. The primary storage unit may be configured to discharge to the primary storage unit under some conditions, and to discharge directly to the one or more components under other conditions. For example, the primary storage unit may be configured to discharge to the one or more components when the efficiency of discharging current to the one or more components exceeds an efficiency of further charging of the intermediate storage and/or discharging current to the primary storage unit.

In some embodiments, the energy harvested from a low current power source may be sufficient to supply power to the one or more components 134. In various settings, the one or more components may typically receive intermittent use at time intervals large enough for the intermediate storage unit to accumulate a charge sufficient to power the components during such intermittent use. Such intermittent use may arise in the context of a distributed computing system where a device 100 or various components 134 of the device typically receive intermittent use. A distributed computing system for a healthcare facility or a supply chain may have printers, scanners, and other devices 100 deployed in various locations that typically receive intermittent use. For example, printers and scanners 100 in a healthcare facility may be used intermittently by healthcare personnel to print and scan images associated with patient identification and management of care. Additionally, medical devices 100 may be used intermittently by healthcare personnel to perform a medical treatment, procedure, or various other care or related tasks. Similarly, printers, scanners, inventory management tools, and other devices 100 stationed in various locations throughout a supply chain environment may be used intermittently for used by personnel who manage or work the supply chain or who perform various related task.

In some embodiments, a positive multiple of a time constant $\tau$ (tau) for the intermediate storage unit may exceed the typical interval between such intermittent use. A device may be provided with an intermediate storage unit configured to accumulate a voltage over the positive multiple of the time constant which voltage exceeds the charge consumed by a typical instance of use of the component. Over a time period reflective of the typical interval between intermittent use, the intermediate storage unit may discharge enough energy to supply electric power to the device 100 or to the components 134. As such, the energy harvested from the low current power source may be sufficient to supply power to the device 100 or to components 134 of the device given such intermittent use under typical operating conditions. In some embodiments, however, the energy harvested from the low current power source may be inadequate to meet the power consumption of the device 100 or of the components 134 of the device under peak operating conditions (e.g., unusually frequent use, high demand situations, etc.) even though the low current power source may be adequate under typical operating conditions.

Figure 4:
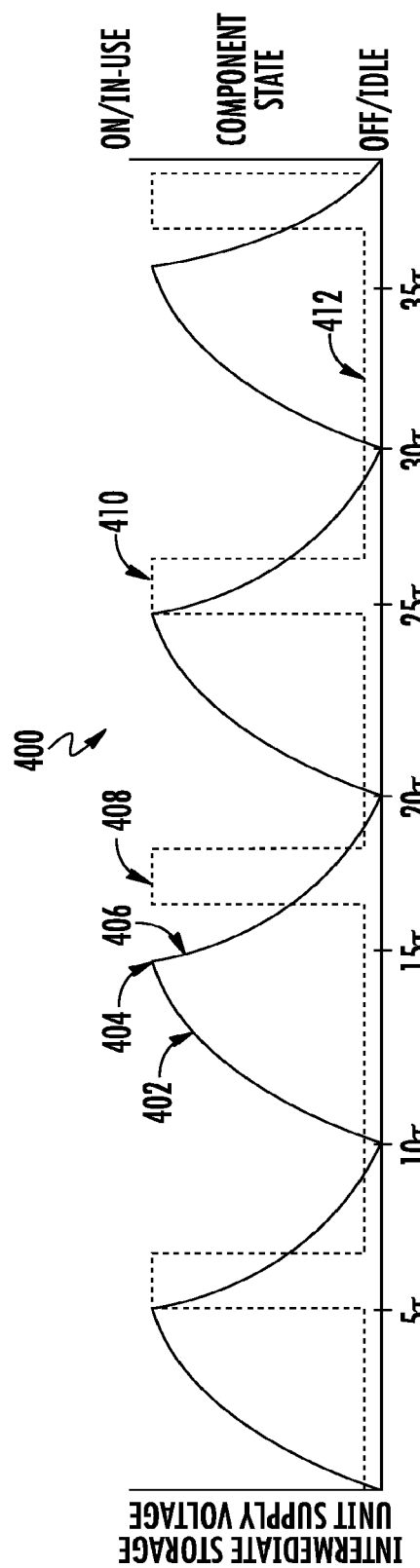
FIG. 4 graphically depicts an exemplary sequence of providing electric power to an electric component in a device.

By way of example, FIG. 4 graphically depicts an example sequence 400 of providing electric power to a component 134 in a device 100. The intermediate storage unit accumulates a charge 402. When the charge on the intermediate storage unit meets a threshold 404, the current may be discharged 406 to the primary storage unit or directly to the components 134. The threshold may include or depend on a positive multiple of a time constant, $\tau$ (tau) for the intermediate storage unit. As shown, the threshold is $5\tau$; however, other suitable thresholds are within the spirit and scope of the present disclosure. Meanwhile, the device 100 or the components 134 receive intermittent use 408. Such use may alternate between On/Off or In-Use/Idle 410, 412, as applicable. The time interval of the intermittent use shown in FIG. 4 matches or exceeds the threshold. A given intermittent use of the device 100 or the components 134 may consume up to all of the electrical energy harvested from the low current power source. Thus, the low current power source may be sufficient to power the device or the components when the time interval of the intermittent use exceeding the threshold.

In some embodiments, the intermediate storage unit may need to progress through several charging and discharging cycles before enough energy will have been accumulated in the primary storage unit to meet the power consumption of the device 100 or components 134. For example, the requisite time interval may exceed $5\tau$, $10\tau$, $15\tau$, or more, reflecting multiple cycles of charging the intermediate storage unit and discharging to the primary storage unit.

Figure 5:
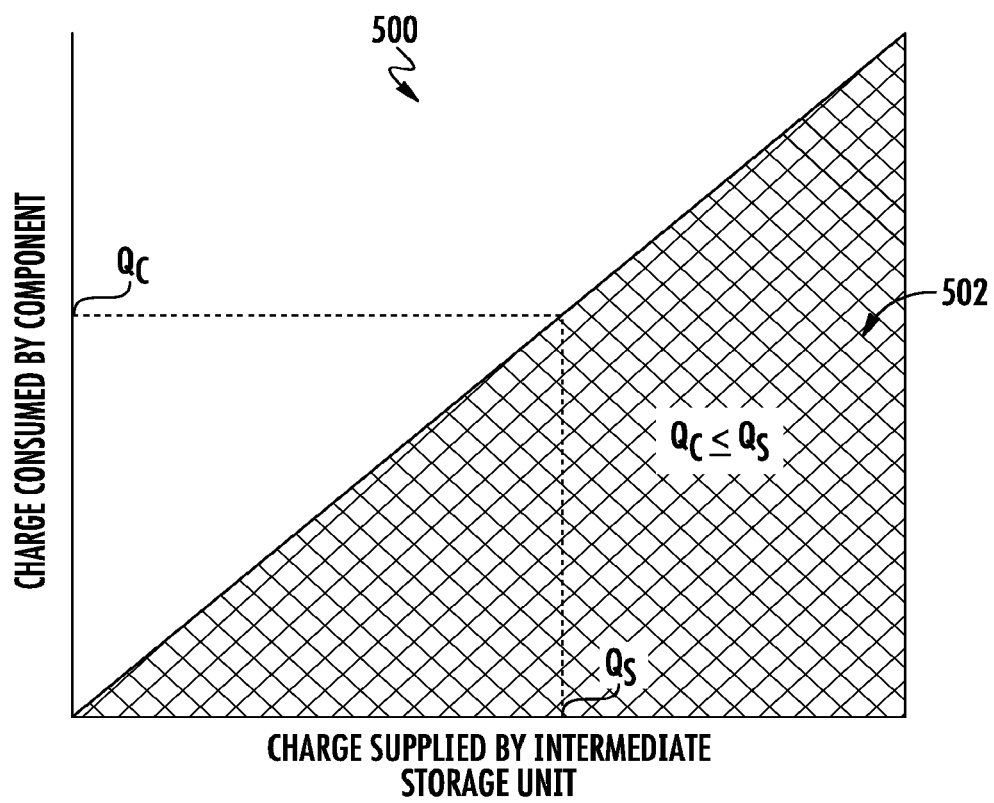
FIG. 5 graphically depicts an exemplary relationship between a charge consumed by a component and a charge supplied by an intermediate storage unit.

FIG. 5 graphically depicts an example relationship 500 between a charge consumed by one or more components 134 and a charge supplied by an intermediate storage unit. The shaded region 502 indicates the condition where the charge consumed by the one or more components is less than or equal to the charge supplied by the intermediate power source over a given time interval. As the time interval between intermittent uses increases, the charge supplied by the intermediate storage unit increases. Accordingly, the time interval may be selected so that the charge supplied by the intermediate power source meets or exceeds the charge consumed by the one or more components.

In some embodiments, a device 100 may be configured to use energy from an intermediate storage unit to power one or more components 134 only when the charge consumed by the one or more components is less than or equal to the charge supplied by the intermediate power source, such as indicated by the relationship shown in FIG. 5. Instead, the device or the one or more components may utilize an alternative power source when the charge consumed by the one or more components exceeds the charge supplied by the intermediate power source. For example, the alternative power source may be a battery or a supercapacitor. The device or the one or more components may utilize such alternative power source, for example, when the time interval between instances of intermittent is less than the time required to accumulate enough energy from the intermediate storage unit to power the device or the one or more components. In some embodiments, a device 100 or components thereof 134 may typically receive intermittent use at time intervals matching or exceeding a positive multiple of a time constant $\tau$ (tau) for the intermediate storage unit. The intermediate storage unit may be configured to accumulate a voltage over the positive multiple of the time constant, which voltage exceeds the charge consumed by a typical instance of intermittent use of the device 100 or the components 134.

Figure 6A:
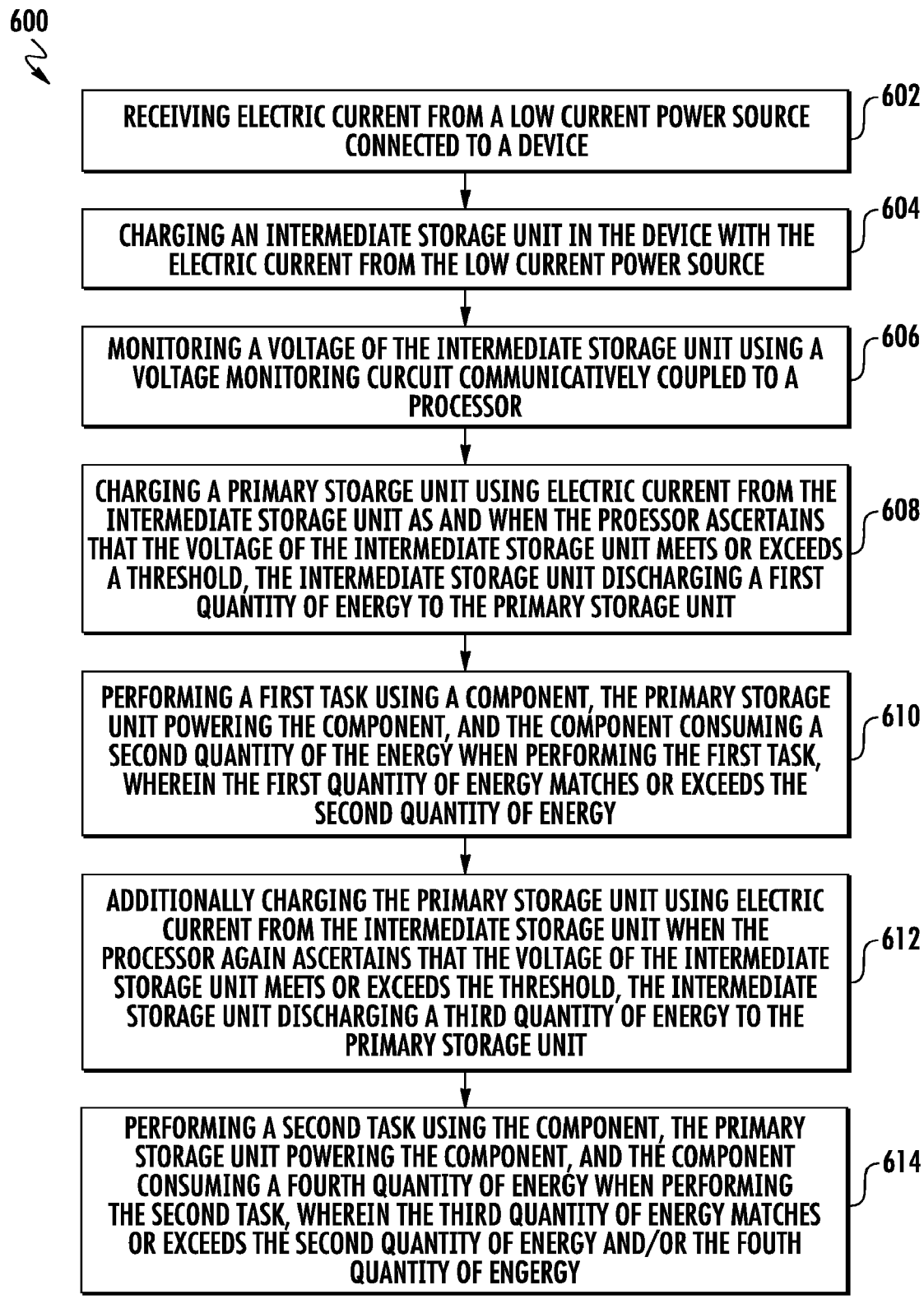
FIG. 6A shows an exemplary method of performing a task using power supplied by an intermediate storage unit.

FIG. 6A shows an exemplary method 600 of performing a task using power supplied by an intermediate storage unit. The method 600 may be applied for any device or device function within the spirit and scope of the present disclosure. An exemplary method 600 begins with a device 100 receiving electric current from a low current power source (e.g., a powered Ethernet cable, a radio frequency field, or other low current power source) connected to the device 610, and charging an intermediate storage unit 124 in the device with the electric current from the low current power source 620. A processor 114 may be configured to monitor a voltage of the intermediate storage unit 630 using a voltage monitoring circuit 132 communicatively coupled to the processor.

The method continues with charging a primary storage unit 128 using electric current from the intermediate storage unit when the processor ascertains that the voltage of the intermediate storage unit meets or exceeds a threshold 640. A suitable threshold may be selected in accordance with the present disclosure. For example, a threshold may include or depend on a voltage of the intermediate storage unit corresponding to a positive multiple of a time constant $\tau$ (tau) for the intermediate storage unit.

Accordingly, the intermediate storage unit discharges a first quantity of energy to the primary storage unit. The first quantity of energy may correspond to one or more charging and discharging sequences each meeting or exceeding a time interval corresponding to a positive multiple of the time constant, τ (tau). In some embodiments, the time interval may exceed 5τ, 10τ, 15τ, or more, reflecting multiple discharges from the intermediate storage unit to the primary storage unit.

The method 600 continues with performing a first task using a component 650, with the primary storage unit powering the component. The first task may be performed after a first time interval matching or exceeding a positive multiple of the time constant. The component consumes a second quantity of energy when performing the first task, and the first quantity of energy matches or exceeds the second quantity of energy. The second quality of energy may include or equate to a quantity of energy consumed by the component when performing the first task. In some embodiments, the method 600 continues with the primary storage unit undergoing additional charging using electric current from the intermediate storage unit when the processor again ascertains that the voltage of the intermediate storage unit meets or exceeds the threshold 660. The intermediate storage unit accordingly discharges a third quantity of energy to the primary storage unit.

The method continues with performing a second task using the component 670, with the primary storage unit powering the component. The component consumes a fourth quantity of energy when performing the second task, and the third quantity of energy matches or exceeds the second quantity of energy and/or the fourth quantity of energy. In addition, or in the alternative, the method 600 continues with discharging a third quantity of energy from the intermediate storage unit to the primary storage unit, and then performing a second task using the component, with the third quantity of energy matching or exceeding the second quantity of energy. The second task may be performed after a second time interval commencing after the first time interval. The second time interval may match or exceed a positive multiple of the time constant.

Figure 6B:
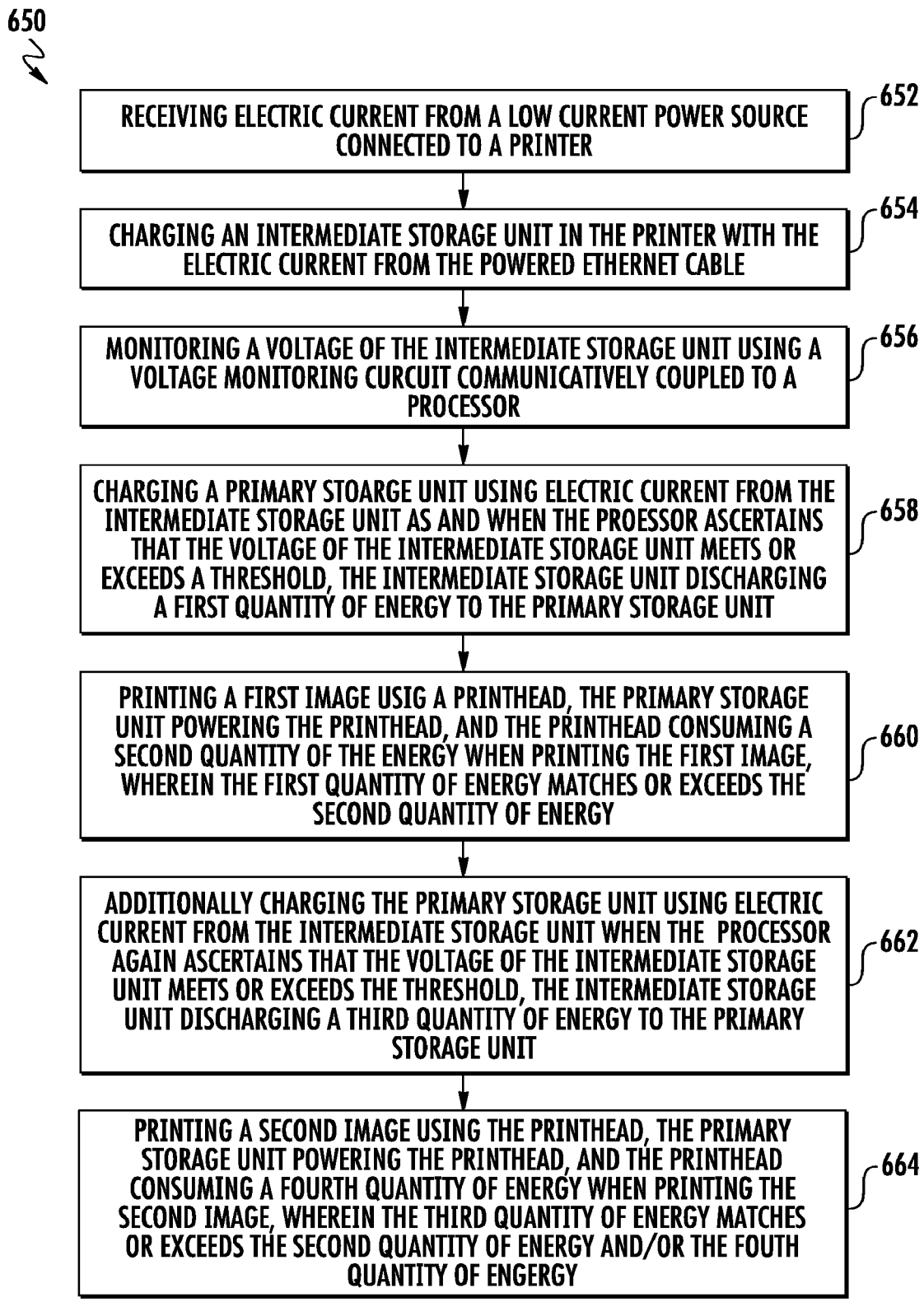
FIG. 6B shows an exemplary method of printing on a print medium using power supplied by an intermediate storage unit.

The method shown in 6A may be performed using any device configured to harvest energy from a low current power source. For example, in some embodiments, the device may be a printer and the task may be printing an image on a print medium. FIG. 6B shows an exemplary method 650 of printing an image on a print medium using power supplied by an intermediate storage unit. The method 600 may be similarly applied for other devices or device functions, which are within the spirit and scope of the present disclosure. An exemplary method 650 begins with a printer (or other device) 100 receiving electric current from a low current power source (e.g., a powered Ethernet cable, a radio frequency field, or other low current power source) connected to the printer 652, and charging an intermediate storage unit 124 in the printer with the electric current from the low current power source 654. A processor 114 may be configured to monitor a voltage of the intermediate storage unit 656 using a voltage monitoring circuit 132 communicatively coupled to the processor.

The method continues with charging a primary storage unit 128 using electric current from the intermediate storage unit when the processor ascertains that the voltage of the intermediate storage unit meets or exceeds a threshold 658. A suitable threshold may be selected in accordance with the present disclosure. For example, a threshold may include or depend on a voltage of the intermediate storage unit corresponding to a positive multiple of a time constant τ (tau) for the intermediate storage unit.

Accordingly, the intermediate storage unit discharges a first quantity of energy to the primary storage unit. The first quantity of energy may correspond to one or more charging and discharging sequences each meeting or exceeding a time interval corresponding to a positive multiple of the time constant τ (tau). In some embodiments, the time interval may exceed 5τ, 10τ, 15τ, or more, reflecting multiple discharges from the intermediate storage unit to the primary storage unit.

The method 650 continues with printing a first image using a printing mechanism (e.g., including a printhead or other component) 660, with the primary storage unit powering the printing mechanism. The first image may be printed after a first time interval matching or exceeding a positive multiple of the time constant. In some embodiments, the printing mechanism printhead consumes a second quantity of energy when printing the first image, and the first quantity of energy matches or exceeds the second quantity of energy. In some embodiments, the printing mechanism includes a printhead. In some embodiments, the printer may be a thermal printer and the printing mechanism includes a thermal printhead. In some embodiments, the second quality of energy may include or equate to a quantity of energy consumed by the thermal printhead when printing the first image.

In some embodiments, the method 650 continues with the primary storage unit undergoing additional charging using electric current from the intermediate storage unit as and when the processor again ascertains that the voltage of the intermediate storage unit meets or exceeds the threshold 662. The intermediate storage unit accordingly discharges a third quantity of energy to the primary storage unit. The method continues with printing a second image using the printing mechanism (e.g., including a printhead) 664, with the primary storage unit powering the printing mechanism. The printing mechanism consumes a fourth quantity of energy when printing the second image, and the third quantity of energy matches or exceeds the second quantity of energy and/or the fourth quantity of energy. In addition, or in the alternative, the method 650 continues with discharging a third quantity of energy from the intermediate storage unit to the primary storage unit, and then printing a second image using the printing mechanism, with the third quantity of energy matching or exceeding the second quantity of energy. The second image may be printed after a second time interval commencing after the first time interval. The second time interval may match or exceed a positive multiple of the time constant.

Figure 7:
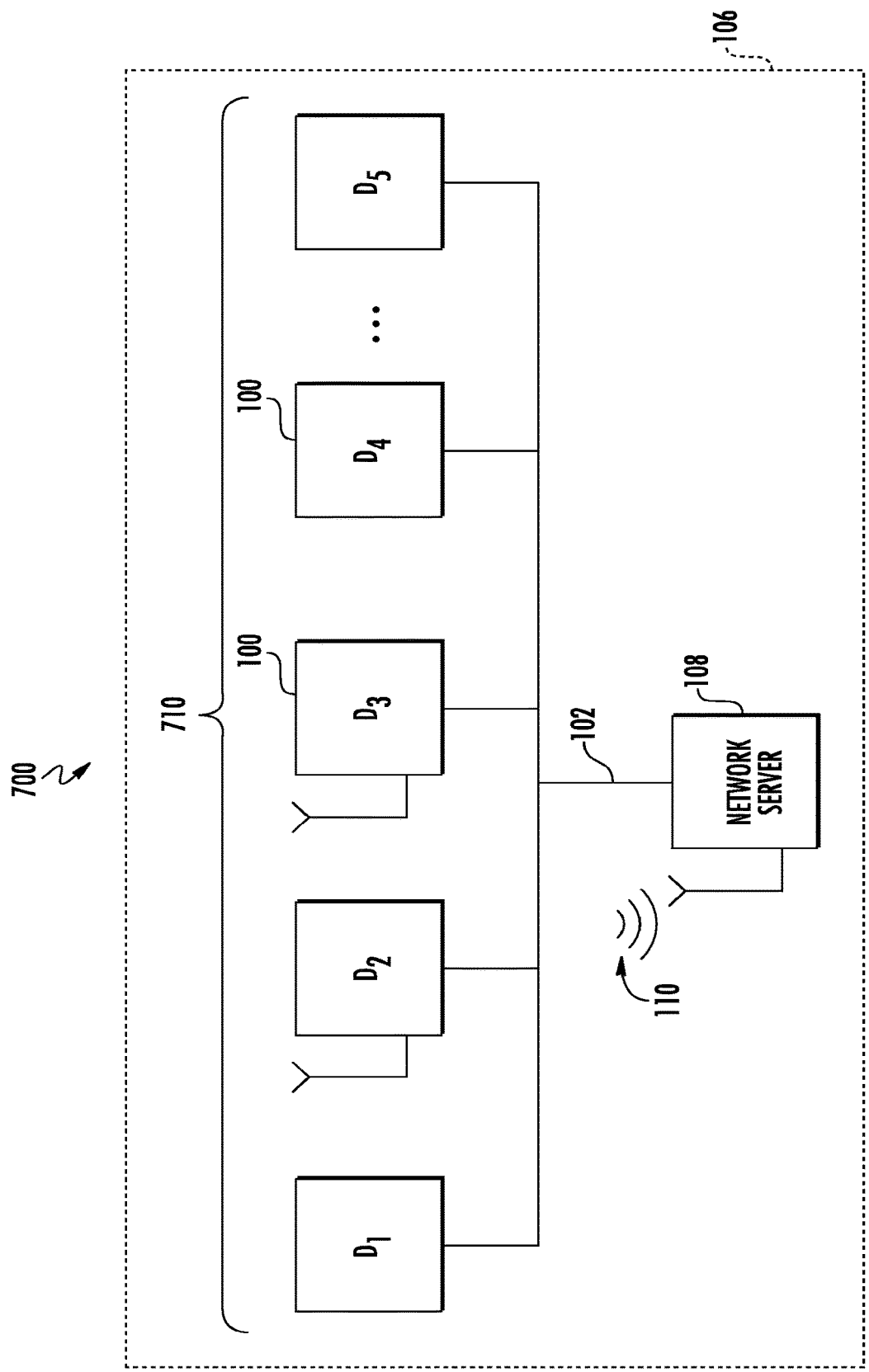
FIG. 7 shows an exemplary distributed computing system.

The devices and methods of the present disclosure may be utilized or implemented in a distributed computing system. For example, FIG. 7 shows an exemplary distributed computing system 700. The distributed computing system includes a plurality of devices 710, which may include one or more devices configured in accordance with the device 100 shown in FIG. 1. The distributed computing system may be part of a network 106 and may include one or more network resources 108 such as a network server.

The distributed computing system may be deployed in the context of a healthcare facility and/or a supply chain environment. The devices 710 may include printers, scanners, medical devices, and inventory management tools. Other devices 710 are also within the spirit and scope of the present disclosure, including other devices used by healthcare personnel to perform a medical treatment, procedure, or various other care, and other devices used by personnel who manage or work in the supply chain or who perform various supply-chain related tasks.

The devices 710 are configured to communicate with the network resource 108 either using a powered Ethernet cable 102 and/or a wireless communication signal 110. The devices are configured to harvest electricity from one or more low current power sources. The low current power source may include a powered Ethernet cable 102, an electric or magnetic field associated with the wireless communications signal 110, or any other suitable low current power source or combination of low current power sources. The network resource may be configured to assign tasks to the plurality of devices. Some of the tasks may be preferentially assigned to a device 100 selected from among the plurality 710. Tasks may be preferentially assigned to a device based one or more criteria associated with the energy harvested from the low current power source. The criteria may include or depend on a time interval, a threshold, or an efficiency factor including those described in the present disclosure. Other distributed computing systems and configurations thereof, and criteria for assigning tasks to devices, will be apparent and are within the sprit and scope of the present disclosure.

Figure 8:
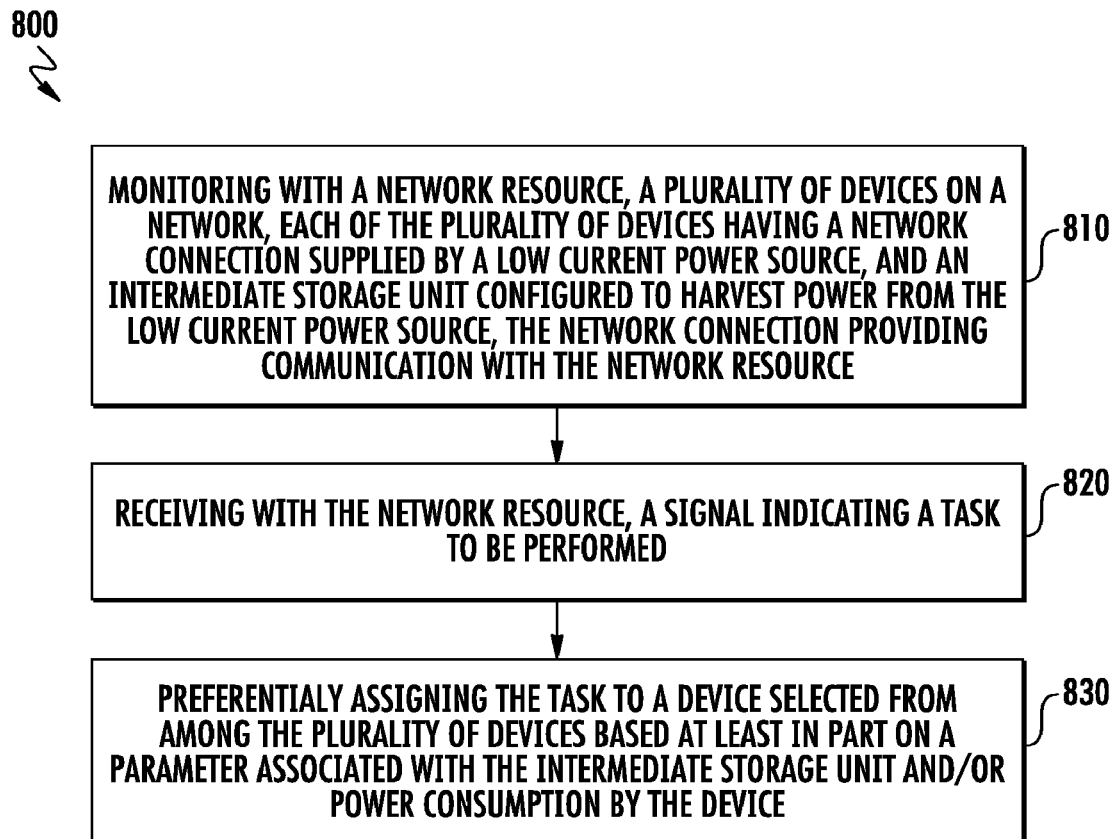
FIG. 8 shows an exemplary method of preferentially assigning tasks to devices in a distributed computing system.

FIG. 8 shows an exemplary method 800 of preferentially assigning tasks to devices 710 in a distributed computing system. The method begins upon monitoring with a network resource 108, a plurality of devices on a network 810. Each of the plurality of devices has a network connection providing communication with the network resource. The network connection may be supplied, for example, by a powered ethernet cable 102 and/or a wireless communications signal 110. Each of the devices further has an intermediate storage unit 124 configured to harvest electricity from a low current power source. The low current power source may be attributed to the network connection, such as the powered ethernet cable or an electric or magnetic field associated with the wireless communications signal. In some embodiments, the low current power source may be FM or AM radio waves.

The method continues with the network resource receiving a signal indicating a task to be performed 820. The network resource preferentially assigns the task to a device selected from among the plurality of the devices based at least in part on a parameter or threshold 830. The parameter or threshold may be associated with the intermediate storage unit and/or power consumption by the device or one or more components thereof.

In some embodiments, the distributed computing system 700 may include a computer network 106 in which a plurality of devices 710 each have a network connection supplied by a low current power source, such as a powered Ethernet cable 102 or a wireless communications signal 110, that allows the devices to communicate with at least one network resource 108.

Each of the plurality of devices 710 may include an intermediate storage unit 124 configured to receive electric current from the low current power source, a primary storage unit 128 configured to receive electric current discharged from the intermediate storage unit, and one or more components 134 configured to use electric current from the primary storage unit to perform a function. As described herein, the electric current form the low current power source at least partially charges the intermediate storage unit. The devices 710 may further include a voltage monitor circuit 132 communicatively coupled to a processor 114 configured to monitor a voltage of the intermediate storage unit. The processor may be configured to discharge current from the intermediate storage when the processor ascertains that the voltage of the intermediate storage unit meets or exceeds a threshold. The electric current from the intermediate storage unit at least partially charges the primary storage unit. As described herein, the primary storage unit also may be configured to provide the electric current directly to the one or more components.

At least some of the devices 100 from among the plurality 710, or one or more components thereof 134, may typically receive intermittent use at time intervals matching or exceeding a positive multiple of a time constant $\tau$ (tau) for the respective intermediate storage unit 124. The respective intermediate storage units may be configured to accumulate a voltage over the positive multiple of the time constant, and the voltage may exceed the charge consumed by a typical instance of use of the respective device or one or more components.

The network resource may include at least one server 108 configured to assign tasks to the plurality of devices. Tasks may be preferentially assigned from time to time to a device selected from among the plurality, or to a component of such a device. The preferential assignment may be based on a time interval having elapsed since the selected device (or component) last performed a task. The time interval may match or exceed a positive multiple of the time constant $\tau$ (tau). In addition, or in the alternative, the preferential assignment also may be based on the respective intermediate storage unit having accumulated a voltage corresponding to a threshold. A suitable threshold may be selected in accordance with the present disclosure. For example, a threshold may include or depend on a voltage of the intermediate storage unit corresponding to a positive multiple of a time constant $\tau$ (tau) for the intermediate storage unit.

In some embodiments, the network resource may be configured to preferentially assign a next task to a device selected from among the plurality based on the selected device having discharged a first quantity of energy from the intermediate storage unit to the primary storage unit since the selected device last performed a previous task. The first quantity of energy may match or exceed a second quantity of energy attributed to the next task. For example, the second quantity of energy may include or depend on a quantity of energy necessary or sufficient for performing the next task.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367;

8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036; 9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140; U.S. Design Pat. No. D702,237; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Pat. No. D734,339; U.S. Design Pat. No. D737,321; U.S. Design Pat. No. D754,205; U.S. Design Pat. No. D754,206; U.S. Design Pat. No. D757,009; U.S. Design Pat. No. D760,719; U.S. Design Pat. No. D762,604; U.S. Design Pat. No. D766,244; U.S. Design Pat. No. D777,166; U.S. Design Pat. No. D771,631; U.S. Design Pat. No. D783,601; U.S. Design Pat. No. D785,617; U.S. Design Pat. No. D785,636; U.S. Design Pat. No. D790,505; U.S. Design Pat. No. D790,546; International Publication No. 2013/163789; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0332996; U.S. Patent Application Publication No. 2014/0001267; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0125853; U.S. Patent Application Publication No. 2014/0125999; U.S. Patent Application Publication No. 2014/0129378; U.S. Patent Application Publication No. 2014/0131443; U.S. Patent Application Publication No. 2014/0133379; U.S. Patent Application Publication No. 2014/0136208; U.S. Patent Application Publication No. 2014/0140585; U.S. Patent Application Publication No. 2014/0152882; U.S. Patent Application Publication No. 2014/0158770; U.S. Patent Application Publication No. 2014/0159869; U.S. Patent Application Publication No. 2014/0166759; U.S. Patent Application Publication No. 2014/0168787; U.S. Patent Application Publication No. 2014/0175165; U.S. Patent Application Publication No. 2014/0191684; U.S. Patent Application Publication No. 2014/0191913; U.S. Patent Application Publication No. 2014/0197304; U.S. Patent Application Publication No. 2014/0214631; U.S. Patent Application Publication No. 2014/0217166; U.S. Patent Application Publication No. 2014/0231500; U.S. Patent Application Publication No. 2014/0247315; U.S. Patent Application Publication No. 2014/0263493; U.S. Patent Application Publication No. 2014/0263645; U.S. Patent Application Publication No. 2014/0270196; U.S. Patent U.S. Patent Application Publication No. 2014/0270229; U.S. Patent Application Publication No. 2014/0278387; U.S. Patent Application Publication No. 2014/0288933; U.S. Patent Application Publication No. 2014/0297058; U.S. Patent Application Publication No. 2014/0299665; U.S. Patent Application Publication No. 2014/0332590; U.S. Patent Application Publication No. 2014/0351317; U.S. Patent Application Publication No. 2014/0362184; U.S. Patent Application Publication No. 2014/0363015; U.S. Patent Application Publication No. 2014/0369511; U.S. Patent Application Publication No. 2014/0374483; U.S. Patent Application Publication No. 2014/0374485; U.S. Patent Application Publication No. 2015/0001301; U.S. Patent Application Publication No. 2015/0001304; U.S. Patent Application Publication No. 2015/0009338; U.S. Patent Application Publication No. 2015/0014416; U.S. Patent Application Publication No. 2015/0021397; U.S. Patent Application Publication No. 2015/0028104; U.S. Patent Application Publication No. 2015/0029002; U.S. Patent Application Publication No. 2015/0032709; U.S. Patent Application Publication No. 2015/0039309; U.S. Patent Application Publication No. 2015/0039878; U.S. Patent Application Publication No. 2015/0040378; U.S. Patent Application Publication No. 2015/0049347; U.S. Patent Application Publication No. 2015/0051992; U.S. Patent Application Publication No. 2015/0053769; U.S. Patent Application Publication No. 2015/0062366; U.S. Patent Application Publication No. 2015/0063215; U.S. Patent Application Publication No. 2015/0088522; U.S. Patent Application Publication No. 2015/0096872; U.S. Patent Application Publication No. 2015/0100196; U.S. Patent Application Publication No. 2015/0102109; U.S. Patent Application Publication No. 2015/0115035; U.S. Patent Application Publication No. 2015/0127791; U.S. Patent Application Publication No. 2015/0128116; U.S. Patent Application Publication No. 2015/0133047; U.S. Patent Application Publication No. 2015/0134470; U.S. Patent Application Publication No. 2015/0136851; U.S. Patent Application Publication No. 2015/0142492; U.S. Patent Application Publication No. 2015/0144692; U.S. Patent Application Publication No. 2015/0144698; U.S. Patent Application Publication No. 2015/0149946; U.S. Patent Application Publication No. 2015/0161429; U.S. Patent Application Publication No. 2015/0178523; U.S. Patent Application Publication No. 2015/0178537; U.S. Patent Application Publication No. 2015/0178685; U.S. Patent Application Publication No. 2015/0181109; U.S. Patent Application Publication No. 2015/0199957; U.S. Patent Application Publication No. 2015/0210199; U.S. Patent Application Publication No. 2015/0212565; U.S. Patent Application Publication No. 2015/0213647; U.S. Patent Application Publication No. 2015/0220753; U.S. Patent Application Publication No. 2015/0220901; U.S. Patent Application Publication No. 2015/0227189; U.S. Patent Application Publication No. 2015/0236984; U.S. Patent Application Publication No. 2015/0239348; U.S. Patent Application Publication No. 2015/0242658; U.S. Patent Application Publication No. 2015/0248572; U.S. Patent Application Publication No. 2015/0254485; U.S. Patent Application Publication No. 2015/0261643; U.S. Patent Application Publication No. 2015/0264624; U.S. Patent Application Publication No. 2015/0268971; U.S. Patent Application Publication No. 2015/0269402; U.S. Patent Application Publication No. 2015/0288689; U.S. Patent Application Publication No. 2015/0288896; U.S. Patent Application Publication No. 2015/0310243; U.S. Patent Application Publication No. 2015/0310244; U.S. Patent Application Publication No. 2015/0310389; U.S. Patent Application Publication No. 2015/0312780; U.S. Patent Application Publication No. 2015/0327012; U.S. Patent Application Publication No. 2016/0014251; U.S. Patent Application Publication No. 2016/0025697; U.S. Patent Application Publication No. 2016/0026838; U.S. Patent Application Publication No. 2016/0026839; U.S. Patent Application Publication No. 2016/0040982; U.S. Patent Application Publication No. 2016/0042241; U.S. Patent Application Publication No. 2016/0057230; U.S. Patent Application Publication No. 2016/0062473; U.S. Patent Application Publication No. 2016/0070944; U.S. Patent Application Publication No. 2016/0092805; U.S. Patent Application Publication No. 2016/0101936; U.S. Patent Application Publication No. 2016/0104019; U.S. Patent Application Publication No. 2016/0104274; U.S. Patent Application Publication No. 2016/0109219; U.S. Patent Application Publication No. 2016/0109220; U.S. Patent Application Publication No. 2016/0109224; U.S. Patent Application Publication No. 2016/0112631; U.S. Patent Application Publication No. 2016/0112643; U.S. Patent Application Publication No. 2016/0117627; U.S. Patent Application Publication No. 2016/0124516; U.S. Patent Application Publication No. 2016/0125217; U.S. Patent Application Publication No. 2016/0125342; U.S. Patent Application Publication No. 2016/0125873; U.S. Patent Application Publication No. 2016/0133253; U.S. Patent Application Publication No. 2016/0171597; U.S. Patent Application Publication No. 2016/0171666; U.S. Patent Application Publication No. 2016/0171720; U.S. Patent Application Publication No. 2016/0171775; U.S. Patent Application Publication No. 2016/0171777; U.S. Patent Application Publication No. 2016/0174674; U.S. Patent Application Publication No. 2016/0178479; U.S. Patent Application Publication No. 2016/0178685; U.S. Patent Application Publication No. 2016/0178707; U.S. Patent Application Publication No. 2016/0179132; U.S. Patent Application Publication No. 2016/0179143; U.S. Patent Application Publication No. 2016/0179368; U.S. Patent Application Publication No. 2016/0179378; U.S. Patent Application Publication No. 2016/0180130; U.S. Patent Application Publication No. 2016/0180133; U.S. Patent Application Publication No. 2016/0180136; U.S. Patent Application Publication No. 2016/0180594; U.S. Patent Application Publication No. 2016/0180663; U.S. Patent Application Publication No. 2016/0180678; U.S. Patent Application Publication No. 2016/0180713; U.S. Patent Application Publication No. 2016/0185136; U.S. Patent Application Publication No. 2016/0185291; U.S. Patent Application Publication No. 2016/0186926; U.S. Patent Application Publication No. 2016/0188861; U.S. Patent Application Publication No. 2016/0188939; U.S. Patent Application Publication No. 2016/0188940; U.S. Patent Application Publication No. 2016/0188941; U.S. Patent Application Publication No. 2016/0188942; U.S. Patent Application Publication No. 2016/0188943; U.S. Patent Application Publication No. 2016/0188944; U.S. Patent Application Publication No. 2016/0189076; U.S. Patent Application Publication No. 2016/0189087; U.S. Patent Application Publication No. 2016/0189088; U.S. Patent Application Publication No. 2016/0189092; U.S. Patent Application Publication No. 2016/0189284; U.S. Patent Application Publication No. 2016/0189288; U.S. Patent Application Publication No. 2016/0189366; U.S. Patent Application Publication No. 2016/0189443; U.S. Patent Application Publication No. 2016/0189447; U.S. Patent Application Publication No. 2016/0189489; U.S. Patent Application Publication No. 2016/0192051; U.S. Patent Application Publication No. 2016/0202951; U.S. Patent Application Publication No. 2016/0202958; U.S. Patent Application Publication No. 2016/0202959; U.S. Patent Application Publication No. 2016/0203021; U.S. Patent Application Publication No. 2016/0203429; U.S. Patent Application Publication No. 2016/0203797; U.S. Patent Application Publication No. 2016/0203820; U.S. Patent Application Publication No. 2016/0204623; U.S. Patent Application Publication No. 2016/0204636; U.S. Patent Application Publication No. 2016/0204638; U.S. Patent Application Publication No. 2016/0227912; U.S. Patent Application Publication No. 2016/0232891; U.S. Patent Application Publication No. 2016/0292477; U.S. Patent Application Publication No. 2016/0294779; U.S. Patent Application Publication No. 2016/0306769; U.S. Patent Application Publication No. 2016/0314276; U.S. Patent Application Publication No. 2016/0314294; U.S. Patent Application Publication No. 2016/0316190; U.S. Patent Application Publication No. 2016/0323310; U.S. Patent Application Publication No. 2016/0325677; U.S. Patent Application Publication No. 2016/0327614; U.S. Patent Application Publication No. 2016/0327930; U.S. Patent Application Publication No. 2016/0328762; U.S. Patent Application Publication No. 2016/0330218; U.S. Patent Application Publication No. 2016/0343163; U.S. Patent Application Publication No. 2016/0343176; U.S. Patent Application Publication No. 2016/0364914; U.S. Patent Application Publication No. 2016/0370220; U.S. Patent Application Publication No. 2016/0372282; U.S. Patent Application Publication No. 2016/0373847; U.S. Patent Application Publication No. 2016/0377414; U.S. Patent Application Publication No. 2016/0377417; U.S. Patent Application Publication No. 2017/0010141; U.S. Patent Application Publication No. 2017/0010328; U.S. Patent Application Publication No. 2017/0010780; U.S. Patent Application Publication No. 2017/0016714; U.S. Patent Application Publication No. 2017/0018094; U.S. Patent Application Publication No. 2017/0046603; U.S. Patent Application Publication No. 2017/0047864; U.S. Patent Application Publication No. 2017/0053146; U.S. Patent Application Publication No. 2017/0053147; U.S. Patent Application Publication No. 2017/0053647; U.S. Patent Application Publication No. 2017/0055606; U.S. Patent Application Publication No. 2017/0060316; U.S. Patent Application Publication No. 2017/0061961; U.S. Patent Application Publication No. 2017/0064634; U.S. Patent Application Publication No. 2017/0083730; U.S. Patent Application Publication No. 2017/0091502; U.S. Patent Application Publication No. 2017/0091706; U.S. Patent Application Publication No. 2017/0091741; U.S. Patent Application Publication No. 2017/0091904; U.S. Patent Application Publication No. 2017/0092908; U.S. Patent Application Publication No. 2017/0094238; U.S. Patent Application Publication No. 2017/0098947; U.S. Patent Application Publication No. 2017/0100949; U.S. Patent Application Publication No. 2017/0108838; U.S. Patent Application Publication No. 2017/0108895; U.S. Patent Application Publication No. 2017/0118355; U.S. Patent Application Publication No. 2017/0123598; U.S. Patent Application Publication No. 2017/0124369; U.S. Patent Application Publication No. 2017/0124396; U.S. Patent Application Publication No. 2017/0124687; U.S. Patent Application Publication No. 2017/0126873; U.S. Patent Application Publication No. 2017/0126904; U.S. Patent Application Publication No. 2017/0139012; U.S. Patent Application Publication No. 2017/0140329; U.S. Patent Application Publication No. 2017/0140731; U.S. Patent Application Publication No. 2017/0147847; U.S. Patent Application Publication No. 2017/0150124; U.S. Patent Application Publication No. 2017/0169198; U.S. Patent Application Publication No. 2017/0171035; U.S. Patent Application Publication No. 2017/0171703; U.S. Patent Application Publication No. 2017/0171803; U.S. Patent Application Publication No. 2017/0180359; U.S. Patent Application Publication No. 2017/0180577; U.S. Patent Application Publication No. 2017/0181299; U.S. Patent Application Publication No. 2017/0190192; U.S. Patent Application Publication No. 2017/0193432; U.S. Patent Application Publication No. 2017/0193461; U.S. Patent Application Publication No. 2017/0193727; U.S. Patent Application Publication No. 2017/0199266; U.S. Patent Application Publication No. 2017/0200108; and U.S. Patent Application Publication No. 2017/0200275.

OTHER EMBODIMENTS AND ASPECTS

The foregoing detailed description and accompanying figures set forth typical embodiments of the devices, systems, and methods presently disclosed. The present disclosure is not limited to such exemplary embodiments. It will be apparent that numerous other devices, systems, and methods may be provided in accordance with the present disclosure. The present disclosure may utilize any variety of aspects, features, or steps, or combinations thereof which may be within the contemplation of those skilled in the art.

Exemplary healthcare facilities include a hospital, an ambulatory surgical center, a doctors' office, an urgent care clinic, a nursing home, a community health center, a hospice facility, a hospital ship, a hospital train, an inpatient facility, a long-term care facility, a pharmacy, an outpatient clinic, a respite care setting, a home-based healthcare setting, a walk-in clinic, an alternative medicine facility, a physical therapy facility, and the like.

Exemplary supply chain environments include a manufacturing facility, a distribution facility, an order-fulfillment facility, a shipping facility, a returns-facility, a transportation or delivery vehicle, a tractor-trailer vehicle, rolling stock, a ship or marine vessel, an airplane or other aircraft, a warehouse, a shipping container, a customer service center, a supplier's facility, a distributor's facility, a retailer's facility, a wholesaler's facility, an importer's facility, a raw materials site, and the like. Additional exemplary supply chain environments include various types of healthcare facilities.

Various embodiments have been set forth via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects and/or features of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of ordinary skill in the art in light of the present disclosure.

In addition, those skilled in the art will appreciate that some mechanisms of the subject matter described herein are capable of being distributed as a program product in a variety of forms, and that an illustrative embodiment of the subject matter described herein applies equally regardless of the signal bearing media used to carry out the distribution. Examples of a signal bearing media include, but are not limited to, the following: recordable type media such as volatile and non-volatile memory devices, floppy and other removable disks, hard disk drives, SSD drives, flash drives, optical discs (e.g., CD ROMs, DVDs, etc.), and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control elements (e.g., feedback for sensing temperature; control heaters for adjusting temperature). A typical data processing system may be implemented utilizing any suitable commercially available components, such as those typically found in data computing/communication and/or network computing/communication systems.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a functionality can be seen as "associated with" each other such that the desired functionality is achieved, irrespective of architectures or intermedial components. Likewise, any two components so associated can also be viewed as being "operably connected", or "operably coupled", to each other to achieve the desired functionality. Specific examples of operably couplable include but are not limited to physically mateable and/or physically interacting components and/or wirelessly interactable and/or wirelessly interacting components and/or logically interacting and/or logically interactable components.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those skilled in the art. The various aspects, features, and embodiments disclosed herein are for purposes of illustration and are not intended to be limiting. It is intended that the scope of the present invention be defined by the following claims and their equivalents:

The invention claimed is:

1. A method of providing electric power to a component in a device, the method comprising:
   monitoring at least one device of a plurality of devices on a network, wherein the at least one device comprises an intermediate storage unit;
   assigning a task to the at least one device based on a parameter associated with at least one of the intermediate storage unit and the at least one device;
   charging the intermediate storage unit in the at least one device with electric current from one or more low current power sources connected to the at least one device, based on the assigned task; and
   charging a primary storage unit using the electric current from the intermediate storage unit when the processor ascertains that a voltage of the intermediate storage unit meets or exceeds a threshold, wherein the intermediate storage unit discharges varying quantities of the electric current at varying time intervals to the primary storage unit based on the assigned task, and wherein the primary storage unit provides the electric current to the component to cause the at least one device to perform the task.

2. The method of claim 1, wherein the at least one device comprises a thermal printer and wherein the component comprises a printing mechanism.

3. The method of claim 1, wherein the component receives electrical power solely from the primary storage unit.

4. The method of claim 1, wherein the intermediate storage unit comprises at least one capacitor and/or at least one supercapacitor.

5. The method of claim 1, wherein the primary storage unit comprises a rechargeable battery.

6. The method of claim 1, wherein the threshold comprises a voltage range of the intermediate storage unit, the range falling between a lower voltage sufficient for efficiently discharging current to the primary storage unit and an upper voltage sufficient for further charging of the intermediate storage unit to be inefficient.

7. The method of claim 1, wherein the component typically receives intermittent use at time intervals matching or exceeding a positive multiple of a time constant, tau, comprising a resistance of charging the intermediate storage unit multiplied by a capacitance of the intermediate storage unit, and wherein the intermediate storage unit is configured to accumulate a voltage over the positive multiple of the time constant which voltage exceeds the charge consumed by a typical instance of use of the component.

8. The method of claim 1, wherein the intermediate storage unit comprises a plurality of capacitors and/or supercapacitors in series.

9. The method of claim 1, wherein the intermediate storage unit comprises a plurality of capacitors and/or supercapacitors in parallel.

10. The method of claim 1, wherein the one or more low current power sources comprise one or more of a powered Ethernet cable, a solar cell, electric field associated with wireless communication, magnetic field associated with wireless communication, or a powered Universal Serial Bus.

11. A system comprising:
a server communicating with at least one device of a plurality of devices via a network, wherein the server is configured to:
monitor the at least one device comprising an intermediate storage unit; and
assign a task to the at least one device based on a parameter associated with at least one of the intermediate storage unit and the at least one device; and
the at least one device comprising:
the intermediate storage unit configured to receive electric current from one or more low current power sources, the electric current from the one or more low current power sources at least partially charging the intermediate storage unit based on the assigned task; and
a primary storage unit configured to receive electric current from the intermediate storage unit when ascertains that a voltage of the intermediate storage unit meets or exceeds a threshold, wherein the intermediate storage unit is configured to discharge varying quantities of the electric current at varying time intervals to the primary storage unit based on the assigned task, and wherein the electric current from the intermediate storage unit at least partially charges the primary storage unit to provide electric current to a component of the at least one device to cause the at least one device to perform the task.

12. The system of claim 11, wherein the at least one device comprises a thermal printer and wherein the component comprises a printing mechanism.

13. The system of claim 11, wherein the component receives electrical power solely from the primary storage unit.

14. The system of claim 11, wherein the intermediate storage unit comprises at least one capacitor and/or at least one supercapacitor.

15. The system of claim 11, wherein the primary storage unit comprises a rechargeable battery.

16. The system of claim 11, wherein the threshold comprises a voltage range of the intermediate storage unit, the range falling between a lower voltage sufficient for efficiently discharge current to the primary storage unit and an upper voltage sufficient for further charging of the intermediate storage unit to be inefficient.

17. The system of claim 11, wherein the component typically receives intermittent use at time intervals matching or exceeding a positive multiple of a time constant, tau, comprising a resistance of charging the intermediate storage unit multiplied by a capacitance of the intermediate storage unit, and wherein the intermediate storage unit is configured to accumulate a voltage over the positive multiple of the time constant which voltage exceeds the charge consumed by a typical instance of use of the component.

18. The system of claim 11, wherein the intermediate storage unit comprises a plurality of capacitors and/or supercapacitors, at least a portion of the plurality being arranged in series and/or in parallel.

19. The system of claim 11, wherein the one or more low current power sources include one or more of a powered Ethernet cable, a solar cell, electric field associated with wireless communication, magnetic field associated with wireless communication, or a powered Universal Serial Bus.

20. A method of providing power to a component in a device, the method comprising:
monitoring at least one device of a plurality of devices on a network, wherein the at least one device comprises an intermediate storage unit;
assigning a task to the at least one device based on a parameter associated with at least one of the intermediate storage unit and the at least one device;
charging the intermediate storage unit in the at least one device with the electric current from one or more low current power sources connected to the at least one device, based on the assigned task; and
charging a primary storage unit using the electric current from the intermediate storage unit when the processor ascertains that a voltage of the intermediate storage unit meets or exceeds a charge consumed by a typical instance of use of a component in the at least one device, wherein the intermediate storage unit discharges varying quantities of the electric current at varying time intervals to the primary storage unit based on the assigned task, and wherein the primary storage unit provides the electric current to the component to cause the device to perform the task.

* * * * *